Jan. 15, 1957　　　　L. A. BARR ET AL　　　　2,777,932
TEMPERATURE RESPONSIVE CONTROL CIRCUIT
Filed Sept. 20, 1954　　　　　　　　　　　　4 Sheets-Sheet 1
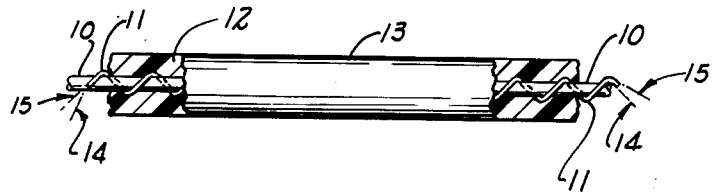
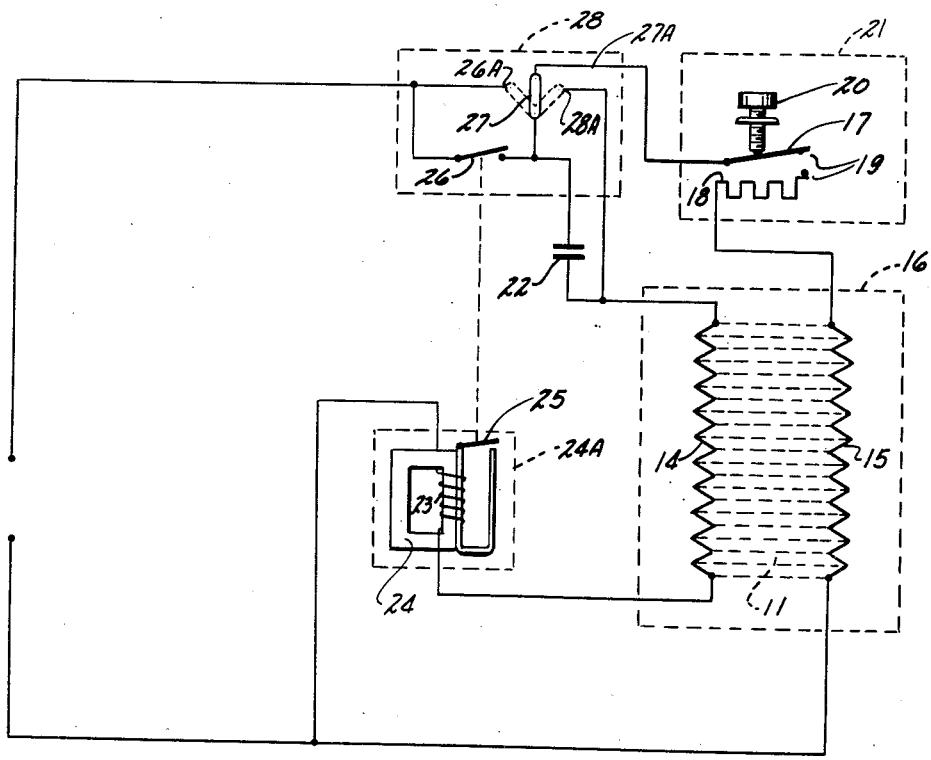
INVENTOR.
LESLIE A. BARR
BY WESLEY D. HENRY
ATTORNEY

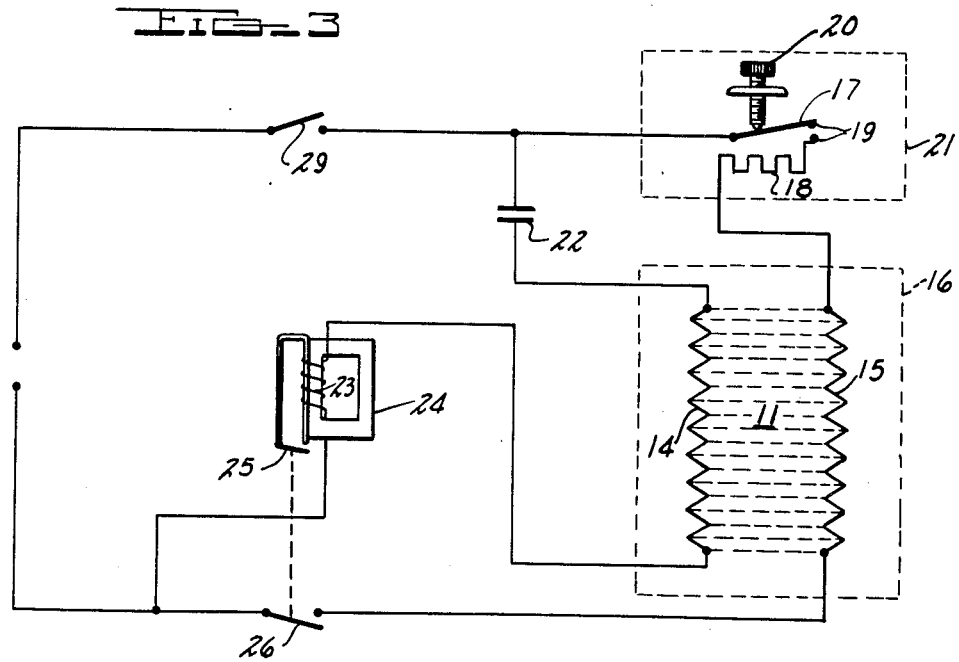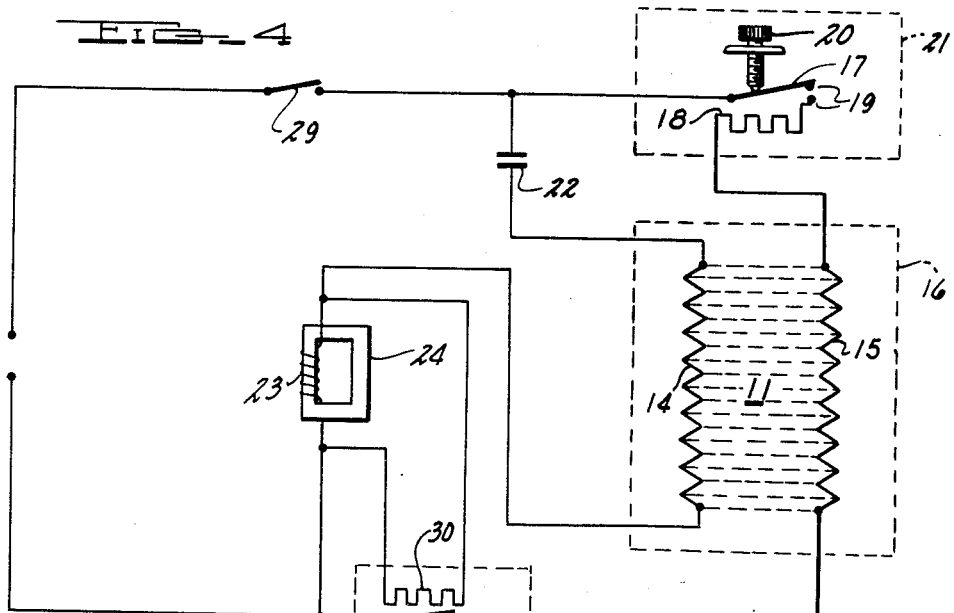

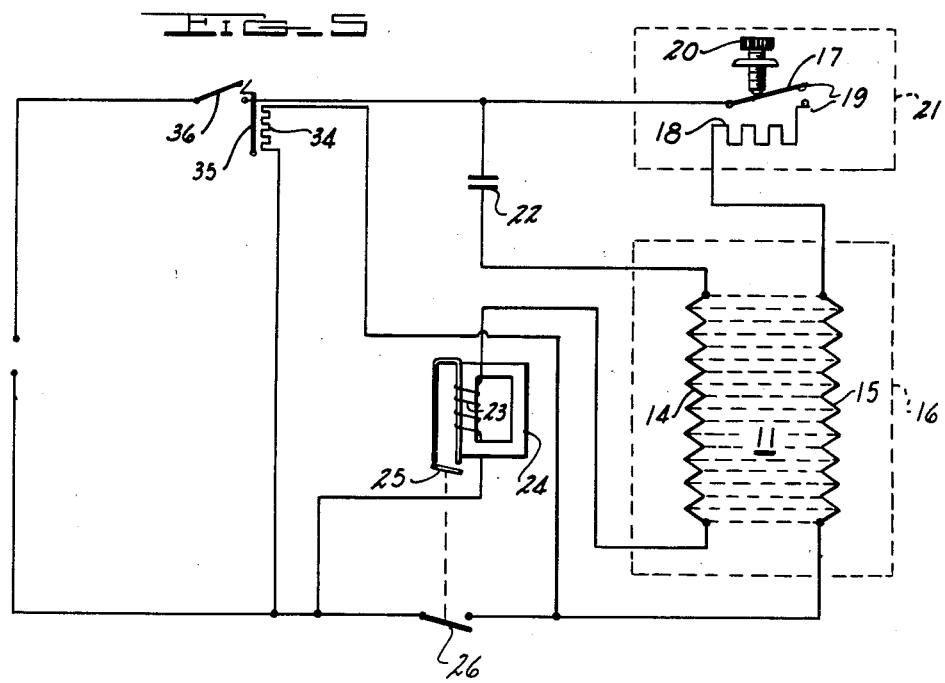
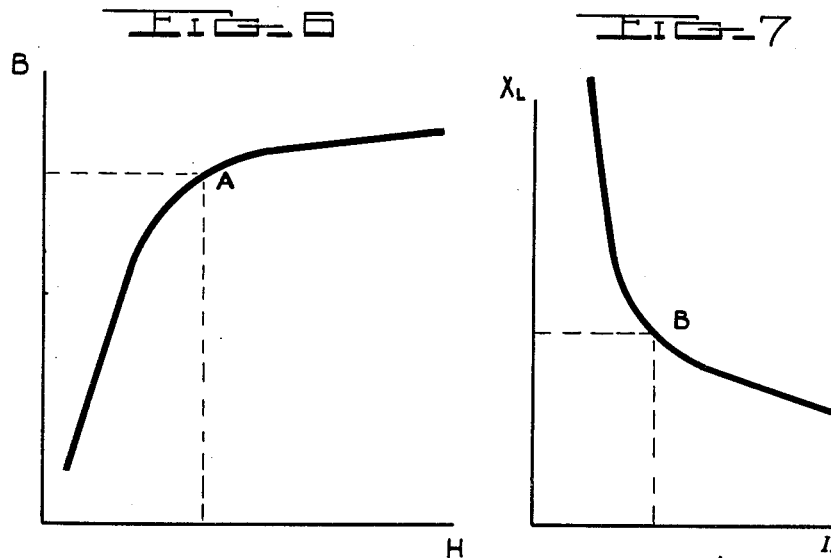

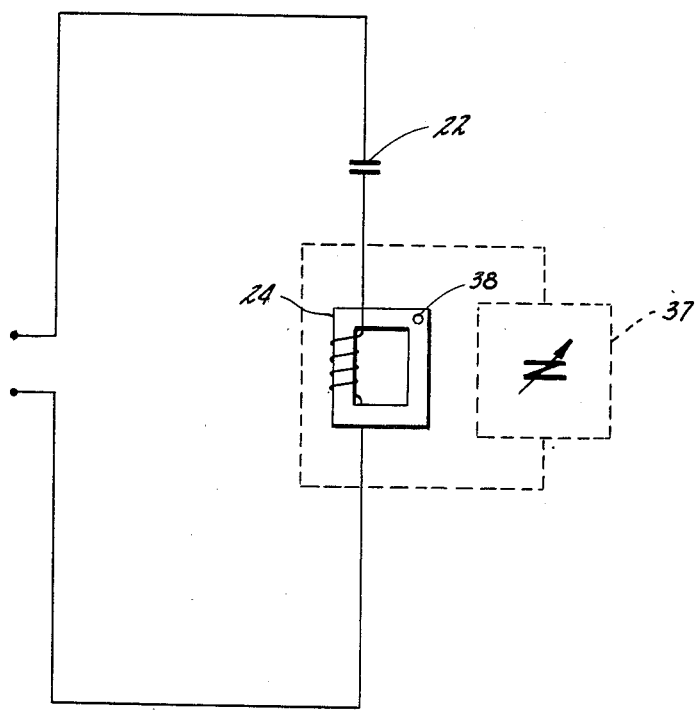

United States Patent Office 2,777,932
Patented Jan. 15, 1957

2,777,932

TEMPERATURE RESPONSIVE CONTROL CIRCUIT

Leslie A. Barr and Wesley D. Henry, Logansport, Ind., assignors to Essex Wire Corporation Application September 20, 1954, Serial No. 457,247

4 Claims. (Cl. 219—20)

This invention relates generally to an electric circuit which is responsive to a given impedance change and is particularly suited as an indicating and/or controlling device registering said impedance change. The circuit may be used to register or control temperature, pressure, velocity or any other physical action which may be linked mechanically or electrically to produce an impedance change. One specific application of the circuit is to control the ultimate temperature of electrically heated fabrics such as electric blankets, sheets and the like.

Previous control circuits for registering an impedance change utilized complicated systems of vacuum tubes and valves to register such an impedance change. The present invention provides an economical replacement for such systems in that it is composed of relatively few parts permitting ease of manufacture and assembly.

In brief, the invention makes use of the non-linear saturating characteristics of an iron-cored inductor in such a way that a non-linear action is obtained. A related feature of the invention is the method for economically adjusting the inductors which is necessary in order that symmetrical operating characteristics prevail. In addition, the control provides "fail safe" operation in that failure of any one component renders the control inoperative in a non-hazardous condition. Finally, the control circuit embodies means of self regulation made necessary due to the possible fluctuation in applied voltage.

It is, therefore, an object of this invention to provide a simple control device for registering impedance change in an alternating current circuit which is economical in nature.

It is a further object of this invention to provide a means of control adjustment to insure uniform operational characteristics.

It is a still further object of the invention to provide a control device which is inherently self regulatory and therefore not influenced by external power variations.

In order that the invention may be understood, it will now be explained in connection with the accompanying drawings wherein the invention is illustrated as applied to electric fabrics and wherein:

Fig. 1 is an elevation partially in section showing a type of electric blanket wire with which the control device may be used.

Fig. 2 is a circuit diagram illustrating the application of the control circuit in combination with the wire of Fig. 1.

Fig. 3 illustrates a modification of the control device wherein the control is made cycling due to magnetic means.

Fig. 4 is a further modification wherein the control is made cycling by thermal means.

Fig. 5 is a further modification wherein the control is a cycling control with means for limiting the number of cycles.

Fig. 6 is a normal magnetization or, B-H curve for a ferrous material.

Fig. 7 shows the relationship between inductive reactance and alternating current.

Fig. 8 illustrates a simple series resonant circuit with a variable shunting impedance.

Before describing the invention as applied to particular applications in detail the theory of circuit operation will be referred to in general.

The control device makes use of a series resonant circuit consisting of inductive and capacitive reactance. The change in whatever condition is being controlled, as for example the temperature of an electric blanket, is linked with the resonant circuit in such a manner as to change the resonant condition. The change in resonance is in turn registered by associated means and again as in the case of the blanket, used for example, to cut off the supply of power to the blanket.

One of the principal reasons for using a series resonant circuit in the present control device is so that the device will be "fail safe" thereby avoiding danger to life or property. It is necessary in any circuit wherein different conditions of operation are present that every condition be free from activation by the applied source voltage in the event of failure of any component of the circuit. By the use of the series resonant circuit the control circuit can be made sensitive in every condition of operation to a voltage greater than that of the applied voltage. The use of a resonance circuit, therefore, makes it possible to satisfy the requirements for a "fail safe" control.

Series resonant circuits have been used employing iron-cored inductors and operating on household power frequencies, however, these circuits operate in the linear non-saturated regions (below point A, Fig. 6). A variable shunting effect responsive to the change in condition controlled in these circuits, provides an infinite number of resonant conditions with resonant voltage corresponding to the effective shunting.

The objections to such a system refer to the sensitive work devices that must be used in conjunction therewith. For example, as the resonant voltage changes gradually in accordance with the shunting effect the work device which is intended to register at a given point in the changing scale must be extremely sensitive. For example, if a voltage relay is the registering device, the relay must be accurately pointed. This is an expensive operation and increases the overall cost of the control.

This objection is overcome in the present instance by the use of a unique form of series resonance which inherently provides for two and only two conditions of resonance which means that a work device, such as a voltage relay, of less sensitive design may be used which will operate positively as the circuit alternates from one condition of resonance to another.

The inherent provision of two and only two operating conditions of series resonance is achieved by making one condition of resonance occur upon the saturation of the core of the inductor. It is well known that a given type of iron composition will have a saturation characteristic of the general nature of that shown in Fig. 6. The point A is commonly referred to as the knee of the curve, and represents the point of substantial flux saturation. Any further increase in magnetising force does not produce a proportional increase in flux density. It can be seen, therefore, that the inductance of an inductor is non-linear. By using this non-linearity of inductance two and only two conditions of operating resonance can be had at the same applied voltage, provided the circuit constants are properly selected.

The non-linearity of the inductance referred to is best illustrated by Fig. 7 where inductive reactance $X_1$ is plotted against the root means squared current I through the inductor. Here it may be seen that the actual value of inductive reactance decreases rapidly as the current increases to point B and as the current increases further after passing through B only a slight decrease in inductive reactance occurs. This effect is due primarily to the non-linearity of core saturation as illustrated by point A of Fig. 6 which corresponds to the point B of Fig. 7.

As an illustration of the operation of the resonant circuit in only two conditions of resonance, rather than an infinite number, refer to Fig. 8. If the capacitive reactance of capacitor 22 is chosen so that its reactance at 60 cycles is equal to the reactance of the inductor 24 at a region B or higher a maximum condition of resonance will occur at this point. It is well known that if a predetermined value of current is shunted around the inductor, capacitor, or both, the inductive reactance will increase due to the decrease in current flow in the inductor. This comes about since the decrease in current through the inductor coil produces a slightly lower condition of flux saturation within the inductor core material, the said lower condition being at the knee of Fig. 6, very near A. This new condition of flux density allows the inductor to become more efficient, hence, also increasing its inductive reactance. The new higher value of inductive reactance, therefore, allows a new lower value of current to flow, which in turn produces a still lower value of flux density thereby setting in operation a vast flux change in the inductor core from a saturated condition to a non-saturated condition. Due to the non-linearity and non-sinusoidal wave form of saturation within the inductor at the knee of said curve, the change from one condition of resonance to the other is very rapid. It is apparent that the reverse mechanism also prevails. A rapid and positive change from one condition of resonance to the other is thus achieved.

It has been previously pointed out that a form of self-regulation is necessary in a device of this sort due to the fluctuation in house voltage or, most sources of applied voltage.

It has been found that regulation of the voltage drop across the inductive reactance of inductor coil 24, is possible if the core of the coil is saturated with flux. In the case where the core is not saturated, the reverse is true and a slight increase in applied voltage causes a slight increase in current. The coil inductance is apparently lessened (reference Fig. 7), permitting still more current to flow, therefore the effect of a slight voltage change is amplified. In the event of a saturated core, however, the effect of a line voltage variation is de-amplified. For example, when line voltage is increased slightly, the effect of the inductive reactance is less than in the case of a non-saturated core with the result that the current change in the coil 24 is slight. It is obvious that a selection of the capacitor must be such that when the inductive reactance is equal to the capacitive reactance a condition of saturation must exist in the core. Table I indicates effectiveness of this means of regulation for a relatively wide swing in applied voltage. The necessary resonant voltage increase accompanying the applied voltage increase appears almost totally across the capacitor component of the circuit.

Table I

| $E_i$ | $E_1$ | $E_o$ |
|---|---|---|
| 100 | 225 | 278 |
| 130 | 231 | 315 |

It can be noted from Table I that for a 30 volt increase in applied voltage, the voltage increase across the inductor-relay coil in resonance is but 6 volts. The ordinary house circuit voltage variation is therefore effectively de-amplified as regards the inductive component.

Ordinarily devices employing the hereinbefore described series resonance have a wide spread in operating characteristics. This variance in operating characteristics is due to the wide tolerances necessarily present in the manufacture of the components of the series resonant circuit. For example, in the case of the inductive component, variations exist in the core materials used, in lamination matching, in coil winding, etc. The capacitor is similarly variant and means is required for matching the reactance of the inductor with the reactance of the capacitor taking into consideration any stray capacitance or inductance introduced by other circuit components. Such a means of calibration comprising an economical and accurate method of adjustment has been found. The inductance of the inductor is initially made greater than necessary at the outset. The series resonant circuit is then electrically connected as in an operating condition. The inductance of the inductor is then reduced by removing metal, as by drilling at point 38 in Fig. 8, to match the effective capacitance of the circuit. It is understood that not all core materials lend themselves to this type of adjustment but through the use of the proper selection of material this form of adjustment may be made machine automatic.

Refer now to Figures 2, 3, 4, and 5, in which the aforementioned circuit is illustrated in use to control the ultimate temperature of an electrically heated fabric. In this instance the circuit is used with wire of the type disclosed and claimed in the B. T. Vogler United States Patent No. 2,725,447, dated November 29, 1955. Such wire structurally consists of two conductors separated by thermal sensitive material. The wire is woven, for example, into a blanket in such a manner that when electric current passes therethrough the blanket is warmed evenly. Only one of the conductors is used in warming the blanket, the other is a control or "feeler." The material separating these conductors is thermal sensitive and becomes conductive at elevated temperatures. Thus, when wire temperature rises, as when an over-heated condition or "hot spot" develops in the blanket, through mis-use or other abnormal operation, a conductive path develops between the heater and feeler conductors and shunts the current around inductor 24.

Referring now to Fig. 1, wire 13, as disclosed in the aforementioned Vogler patent, is illustrated. The two parallel conductors 14 and 15 are covered with material 11, such as nylon, which is characterized by the fact that it becomes more conductive as temperature rises. The coated conductors are helically wrapped on an inner-messenger 10 at a pitch determined by the heat output desired. A jacket 12 is supplied overall.

An embodiment of the circuit is illustrated in Fig. 2 wherein an electric blanket is illustrated generally at 16. The ambient control 21 consists of a bi-metal plate 17, contacts 19, heater 18, and adjusting screw 20. This ambient control is separate from the electric blanket and is functioned by room temperature. Thus, it supplies heat to the blanket as dictated by room temperature. If the room temperature decreases, the bi-metal 17 causes contacts 19 to close and current is supplied to the blanket through the series heater 18. After some time, this series heater causes a temperature rise in the bi-metal 17 and contacts 19 are opened. The ambient control will continue to cycle so long as room temperature is at, or lower than, that temperature at which the bi-metal will cause closing of contacts 19. The adjustment 20 permits manual adjustment of the bi-metal to obtain the desired blanket temperature.

The ambient control is, therefore, a measure of room temperature and the integrated time interval of current applied to the blanket. It is additionally necessary to provide means for sensing abnormal blanket conditions such as might occur when a portion of the blanket becomes over-heated. The feeler conductor 14 provides such sensing means. When an over-heated condition occurs, the nylon 11, or other suitable material, separating the heater conductor 15 and feeler conductor 14, becomes conductive and permits current to flow between the conductors. This flow of current is the signal which is used by the series resonant circuit hereinafter described to interrupt the flow of current to the electric blanket to avoid the danger that might develop from a locally over-heated blanket.

The series resonant circuit includes the capacitor 22 and the inductor relay 24A which in turn consists of the magnetically related relay 25, inductor 24 and coil 23. At peak resonance, the relay 25 and associated contacts 26 are closed due to available leakage flux. Thus a circuit is completed through the ambient control 21 and heater wire 15 of the blanket 16. When the flux changes in inductor 24 from a condition of saturation as on peak resonance, to a level below saturation, there is insufficient leakage flux available to hold in the relay 24 with the result that contacts 26 open and the flow of current to the blanket is interrupted. The flux change, of course, occurs when the insulation 11 becomes conductive to a predetermined value, as on localized over-heating of the blanket, thereby reducing the current flowing in inductor coil 23.

Fig. 2 represents a non-cyling type of control and is operated by manually closing switch 28 by momentary contact of switch arm 27 and contact 26A. This in turn produces resonance and closes relay contacts 26. Should an over-heated condition occur in the blanket 16, the condition of saturated resonance will be disturbed in the inductor and a new condition of resonance will be established releasing relay 25 and contacts 26. The circuit is equipped for manual release by operating switch 28 closing momentary contact arm 27 with contact 28A.

Fig. 3 is similar to Fig. 2 except switch 28 is replaced by the simple 2-position switch 29 and relay contacts 26 are so located electrically as to only temporarily interrupt the source of power to the blanket 16. This has been termed a "recycling type" control. As the name implies when the over-heated condition is removed, resonance is restored and power is automatically restored to the blanket.

Fig. 4 illustrates a re-cycle type control which uses the two conditions of existing voltage across the inductor coil 23 to give two values of heating in resistor 30. When the inductor 24 is in peak resonance heat is applied to the bi-metal blade 31 causing it to close contacts with ambient blade 32. When an overheated condition occurs in nylon 11 thereby shunting the inductor and disturbing resonance, a new condition of resonance occurs almost instantaneously applying a reduced voltage to heater 30. This causes bi-mteal blade 31 to open contact with ambient blade 32 interrupting the flow of current to the blanket. The ambient bi-metal 32 is used to compensate for changes in room temperatures so that bi-metal 31 is able to close or open contact at all room temperatures.

Fig. 5 illustrates a control in which the unit will cycle for a limited number of operations when an over-heated condition is present and then shut off permanently. The switch 26 cycles in the same manner as previously described in Fig. 3. When the switch is open, however, current passes through the heater 34. The switch 36 is a 2-position switch which is closed or opened manually and also opened by operation of the bi-metal 35 in response to heater 34. If the switch 26 remains open or cycles several times, enough heat is accumulated in heater 34 to function bi-metal 35 and to permit the latch end of bi-metal 35 to release and open switch 36.

It has been noted that the use of a saturated inductor has a decided effect upon the rapidity of change from one condition of resonant voltage to another. For example, in a preferred embodiment of the present invention a capacitor rated at .15 microfarad is used. The feeler conductor is 36 guage and wound such that its resistance is about 200 to 300 ohms. The feeler and heater conductors are separated by .007 inch nylon. The inductor has 6800 turns #39 ga. wire ⅜" core E/I laminated 4×4. When current in the coil decreases beyond a given point due to the shunting of current around the coil by nylon 11, the voltage across the coil decays almost instantaneously from a resonating voltage of approximately 250 volts to 150 volts. It is important to note that in both conditions a condition of resonance is present.

What is claimed is:

1. In a control system for electrically heated fabrics having a heater conductor and a feeler conductor separated by a thermally sensitive material which at one temperature substantially insulates said conductors and at a second higher temperature provides a conductive path between said conductors: an alternating voltage power source; a nonlinear circuit having only a stable high current resonant state and a stable low current reactive state, said nonlinear circuit including in a series connection a capacitor, said feeler conductor, and a saturable inductor having inductance values variable in accordance with the current in said inductor; a circuit for connecting said nonlinear circuit to said power source; a switch connected in series with said heater conductor; means responsive to the current state of said nonlinear circuit for operating said switch; a circuit connecting said heater conductor and switch to said power source; said nonlinear circuit being in said high current state when said feeler conductor is initially insulated from said heater conductor whereby said switch is operated to energize said heater conductor; said nonlinear circuit abruptly changing to the low current state when said thermally sensitive material conducts between said feeler conductor and said heater conductor to load said nonlinear resonant circuit whereby said switch is released to deenergize said heater conductor; and thermally operate means for limiting the number of repeated changes between said high current and low current states in said nonlinear circuit as the conductive state of the thermally sensitive material changes with temperature reversals.

2. In a control system for electrically heated fabrics having a heater conductor and a feeler conductor separated by a thermally sensitive material which at one temperature substantially insulates said conductors and at a second higher temperature provides a conductive path between said conductors: an alternating voltage power source; a nonlinear circuit having only a stable high current resonant state and a stable low current reactive state, said nonlinear circuit including in a series connection a capacitor, said feeler conductor, and a saturable inductor having inductance values variable in accordance with the current in said inductor; a circuit for connecting said nonlinear circuit to said power source; a switch connected in series with said heater conductor; a circuit connecting said heater conductor and switch to said power source; an electric heater through which passes a heating current having a magnitude dependent upon the current state of said nonlinear circuit; a bimetal element heated by said electric heater for operating said switch; said nonlinear circuit being in said high current state when said feeler conductor is initially insulated from said heater conductor whereby the heat generated by said electric heater causes said bimetal element to operate said switch to complete the circuit energizing said heater conductor; and said nonlinear circuit abruptly changing to the low current state when said thermally sensitive material conducts between said feeler conductor to load said nonlinear resonant circuit whereby the heat generated by said electric heater is insufficient to cause said bimetal element to maintain said switch operated to energize said heater conductor.

3. In a control system for electrically heated fabrics having a heater conductor and a feeler conductor separated by a thermally sensitive material which at one temperature substantially insulates said conductors and at a second higher temperature provides a conductive path between said conductors: an alternating voltage power source; a nonlinear circuit having only a stable high current resonant state and a stable low current reactive state, said nonlinear circuit including in a series connection a capacitor, said feeler conductor, and a saturable inductor having inductance values variable in accordance with the current in said inductor; a circuit for connecting said nonlinear circuit to said power source; a switch connected in series with said heater conductor, said inductor providing electromagnetic means responsive to the current state of said nonlinear circuit for operating said switch; a circuit connecting said heater conductor and switch to said power source; said nonlinear circuit being in said high current state when said feeler conductor is initially insulated from said heater conductor whereby said switch is operated to energize said heater conductor; and said nonlinear circuit abruptly changing to the low current state when said thermally sensitive material conducts between said feeler conductor and said heater conductor to load said nonlinear resonant circuit whereby said switch is released to deenergize said heater conductor.

4. In a control system for electrically heated fabrics having a heater conductor and a feeler conductor separated by a thermally sensitive material which at one temperature substantially insulates said conductors and at a second higher temperature provides a conductive path between said conductors; an alternating voltage power source; a nonlinear circuit having only a stable high current resonant state and a stable low current reactive state, said nonlinear circuit including in a series connection a capacitor, said feeler conductor, and a saturable inductor having inductance values variable in accordance with the current in said inductor, said inductor consisting of a multi-turn coil disposed about a core of ferro-magnetic material from which a portion of said ferro-magnetic material has been removed to adjust the inductance of said inductor to match the effective capacitance of said nonlinear circuit in said high current resonant state; a circuit for connecting said nonlinear circuit to said power source; a switch connected in series with said heater conductor; means responsive to the current state of said nonlinear circuit for operating said switch; a circuit connecting said heater conductor and switch to said power source; said nonlinear circuit being in said high current state when said feeler conductor is initially insulated from said heater conductor whereby said switch is operated to energize said heater conductor; and said nonlinear circuit abruptly changing to the low current state when said thermally sensitive material conducts between said feeler conductor and said heater conductor to load said nonlinear resonant circuit whereby said switch is released to deenergize said heater conductor.

References Cited in the file of this patent

UNITED STATES PATENTS

| 1,843,677 | Indergand | Feb. 2, 1932 |
| 2,320,632 | McMaster | June 1, 1943 |
| 2,429,819 | Jordan | Oct. 28, 1947 |
| 2,588,926 | Holmes | Mar. 11, 1952 |
| 2,611,854 | McNairy | Sept. 23, 1952 |
| 2,669,528 | Stelzer | Feb. 16, 1954 |
| 2,727,975 | Molyneaux et al. | Dec. 20, 1955 |